US011797045B2

(12) United States Patent
Masters et al.

(10) Patent No.: US 11,797,045 B2
(45) Date of Patent: Oct. 24, 2023

(54) DYNAMIC VOLTAGE AND FREQUENCY SCALING (DVFS) WITHIN PROCESSOR CLUSTERS

(71) Applicant: QUALCOMM Incorporated, San Diego, CA (US)

(72) Inventors: Jonathan Masters, Cambridge, MA (US); Pradeep Kanapathipillai, Campbell, CA (US); Manu Gulati, Saratoga, CA (US); Nitin Makhija, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/666,420

(22) Filed: Feb. 7, 2022

(65) Prior Publication Data

US 2023/0093426 A1    Mar. 23, 2023

Related U.S. Application Data

(60) Provisional application No. 63/247,225, filed on Sep. 22, 2021.

(51) Int. Cl.
*G06F 1/12* (2006.01)
*G06F 1/08* (2006.01)
(Continued)

(52) U.S. Cl.
CPC ............... *G06F 1/12* (2013.01); *G06F 1/08* (2013.01); *G06F 1/3206* (2013.01); *G06F 11/3062* (2013.01); *G06F 11/3409* (2013.01)

(58) Field of Classification Search
CPC . G06F 1/12; G06F 1/08; G06F 1/3206; G06F 11/3062; G06F 11/3409
See application file for complete search history.

(56) References Cited

U.S. PATENT DOCUMENTS 6,868,491 B1   3/2005   Moore
6,976,147 B1   12/2005  Isaac et al.
(Continued)

OTHER PUBLICATIONS

International Search Report and Written Opinion for International Patent Application No. PCT/US2022/075566, dated Dec. 16, 2022, 17 pages.

*Primary Examiner* — Kim Huynh
*Assistant Examiner* — Cory A. Latham
(74) *Attorney, Agent, or Firm* — W & T QUALCOMM Incorporated

(57) ABSTRACT

An electronic system has a plurality of processing clusters including a first processing cluster. The first processing cluster further includes a plurality of processors and a power management processor. The power management processor obtains performance information about the plurality of processors, executes power instructions to transition a first processor of the plurality of processors from a first performance state to a second performance state different from the first performance state, and executes one or more debug instructions to perform debugging of a respective processor of the plurality of processors. The power instructions are executed in accordance with the obtained performance information and independently of respective performance states of other processors in the plurality of processors of the first processing cluster. In some implementations, the power management processor receives, from a system controller external to the plurality of processing clusters, a first power allocation for the first processing cluster.

18 Claims, 7 Drawing Sheets

(51) Int. Cl.
    *G06F 11/34*     (2006.01)
    *G06F 11/30*     (2006.01)
    *G06F 1/3206*     (2019.01)

(56) References Cited

U.S. PATENT DOCUMENTS

| | | |
|---|---|---|
| 9,594,566 B1 | 3/2017 | Alexander et al. |
| 10,437,595 B1 | 10/2019 | Kanapathipillai et al. |
| 10,452,117 B1 | 10/2019 | Becker |
| 2008/0168287 A1 | 7/2008 | Berry et al. |
| 2010/0037038 A1* | 2/2010 | Bieswanger .......... G06F 9/5094 713/300 |
| 2011/0179309 A1* | 7/2011 | Pathirane ............ G06F 11/3648 714/E11.029 |
| 2012/0054528 A1 | 3/2012 | Bose et al. |
| 2014/0173294 A1 | 6/2014 | Buer |
| 2015/0067356 A1 | 3/2015 | Trichy Ravi et al. |
| 2015/0134995 A1* | 5/2015 | Park ................... G06F 11/3058 713/340 |
| 2018/0246554 A1 | 8/2018 | Egger et al. |
| 2019/0034238 A1 | 1/2019 | Dorsey et al. |
| 2021/0064426 A1 | 3/2021 | Gupta et al. |

\* cited by examiner

*600*

At a first processing cluster with a plurality of processors and a power management controller:

> Obtain performance information about the plurality of processors 602
>
> > The performance information includes activity levels, energy consumption, temperature measurements, counts of performance limit breaches, and/or throttling instructions for one or more of the plurality of processors 604

> Execute first instructions to transition a first processor of the plurality of processors from a first performance state to a second performance state, different from the first performance state, in accordance with the obtained performance information, independently of respective performance states of other processors in the plurality of processors 606
>
> > Modify a voltage provided to the first processor independently of respective voltages provided to other processors in the plurality of processors 608
>
> > Modify a clock frequency of the first processor independently of respective clock frequencies of other processors in the plurality of processors 610
>
> > In accordance with the performance information indicating an increase in a temperature of the first processor, the second performance state is a state that is associated with lower power consumption than the first performance state 612
>
> > In accordance with the performance information indicating a respective number of performance limit breaches in a respective time period that exceeds a threshold number of performance limit breaches for the respective time period, the second performance state is a state that is associated with lower power consumption than the first performance state 614

> Execute one or more debug instructions to perform debugging of a respective processor 210 of the plurality of processors 616

| Execute one or more debug instructions to ... 616 |

(A)

| The one or more debug instructions are executed to perform debugging of the respective processor of the plurality of processors while the respective processor executes application instructions 620 |

| The first processing cluster includes a cache coupled to one or more of the plurality of processors in the first processing cluster, and the power management processor is configured to perform the debugging of the respective processor using the cache of the first processing cluster 622 |

In accordance with the performance information indicating a third processor of the plurality of processors, different from the first processor, the power management processor transitions from an off state to an on state, the second performance state is a state that is associated with lower power consumption than the first performance state 624 in accordance with the performance information indicating a fourth processor of the plurality of processors, different from the first processor, the power management processor transitions from an on state to an off state, the second performance state is a state that is associated with higher power consumption than the first performance state 626

| Receive from a system controller that is distinct from the plurality of processing clusters, a first power allocation for the first processing cluster 628A |

| Assign respective performance states to the plurality of processors, including the first processor, in accordance with the first power allocation for the first processing cluster 628B |

| Assign the respective performance states to the plurality of processors in accordance with the first power allocation such that aggregate power consumption of the plurality of processors in the first processing cluster does not exceed the first power allocation 630 |

| Communicate with power management circuitry having one or more voltage regulators that supply power to the device 632 |

Figure 6B

DYNAMIC VOLTAGE AND FREQUENCY SCALING (DVFS) WITHIN PROCESSOR CLUSTERS

RELATED APPLICATIONS

This application claims priority to U.S. Provisional Patent Application No. 63/247,225, titled "Dynamic Voltage and Frequency Scaling (DVFS) within Processor Clusters," filed on Sep. 22, 2021, which is hereby incorporated by reference in its entirety.

TECHNICAL FIELD

This application relates generally to power management of an electronic device (e.g., having a system on a chip (SoC)), and in particular, to methods, systems, and non-transitory computer-readable media for controlling power consumption and device performance of an SoC-based electronic device based on dynamic voltage and frequency scaling (DVFS).

BACKGROUND

An electronic device oftentimes integrates a system on a chip (SoC) with a power management integrated circuit (PMIC), communication ports, external memory or storage, and other peripheral function modules on a main logic board. The SoC includes one or more microprocessor or central processing unit (CPU) cores, memory, input/output ports, and secondary storage in a single package. The PMIC is typically disposed adjacent to the SoC on the main logic board and provides multiple direct current (DC) power supply rails to the SoC via conductive wires formed on the main logic board. The PMIC provides a plurality of power rails configured to drive operations of the SoC. Power characteristics (e.g., power consumption, current, and voltage) are monitored and controlled for each power rail and a corresponding portion of the SOC. It would be beneficial to have an efficient and flexible power management mechanism in the SoC to manage power provided by the PMIC.

SUMMARY

To address power management issues of an SoC-based electronic device, it would be highly desirable to provide a semiconductor device or system having a plurality of processor clusters, cluster memory or cache, PMIC, and system memory with a power management processor internal to each processor cluster. Various implementations of systems, methods and devices within the scope of the appended claims each having several aspects, no single one of which is solely responsible for the attributes described herein. Without limiting the scope of the appended claims, after considering this disclosure, and particularly after considering the section entitled "Detailed Description" one will understand how the aspects of various implementations are used to provide a semiconductor device with one or more clusters of processors each of which having a respective power management processor. For each cluster of processors, the respective power management processor is coupled to each processor in the respective cluster, and configured to control respective performance states (e.g., voltage and/or frequency), and/or perform debugging, of the processors of the cluster. In some implementations, the respective power management processor of each cluster of processors is further coupled to a system controller external to the one or more clusters of processors. By these means, the respective power management processor performs power, voltage, current, and thermal management for each cluster of processors on a firmware level, while the system controller enforces power allocations to different clusters of processors on a system level (e.g., using a performance-control software loop).

In one aspect, a power management method is implemented at an electronic device having a first processing cluster. The first processing cluster includes a plurality of processors and a power management processor distinct from the plurality of processors. The method includes obtaining performance information about the plurality of processors by the power management processor. The method further includes in accordance with the obtained performance information, executing first instructions to transition a first processor of the plurality of processors from a first performance state to a second performance state, different from the first performance state, independently of respective performance states of other processors in the plurality of processors. The method further includes executing one or more debug instructions to perform debugging of a respective processor of the plurality of processors. In some embodiments, the one or more debug instructions are executed to perform debugging of the first processor when the first processor operates at the second performance state.

In some implementations, the power management processor is configured to execute second instructions to transition a second processor of the plurality of processors from a third performance state to a fourth performance state in accordance with the obtained performance information, independently of respective performance states of other processors in the plurality of processors. In some implementations, in accordance with the performance information indicating a third processor of the plurality of processors, different from the first processor, transitioning from an off state to an on state, the second performance state is a state that is associated with lower power consumption than the first performance state. In some implementations, in accordance with the performance information indicating a fourth processor of the plurality of processors, different from the first processor, transitioning from an on state to an off state, the second performance state is a state that is associated with higher power consumption than the first performance state.

In another aspect, an electronic device includes a first processing cluster having a plurality of processors and a power management processor that is distinct from the plurality of processors. The power management processor is configured to implement any of the above methods. Alternatively, in another aspect, an electronic device includes a first processing cluster having a plurality of processors, a power management processor, and memory having instructions stored thereon, which when executed by the power management processor cause the power management processor to perform any of the above methods.

These illustrative embodiments and implementations are mentioned not to limit or define the disclosure, but to provide examples to aid understanding thereof. Additional embodiments are discussed in the Detailed Description, and further description is provided there. Other implementations and advantages may be apparent to those skilled in the art in light of the descriptions and drawings in this specification.

BRIEF DESCRIPTION OF THE DRAWINGS

FIGS. 6A and 6B illustrate a flow diagram of a method of managing power consumption of an SoC-based electronic device, in accordance with some implementations.

Figure 1A:
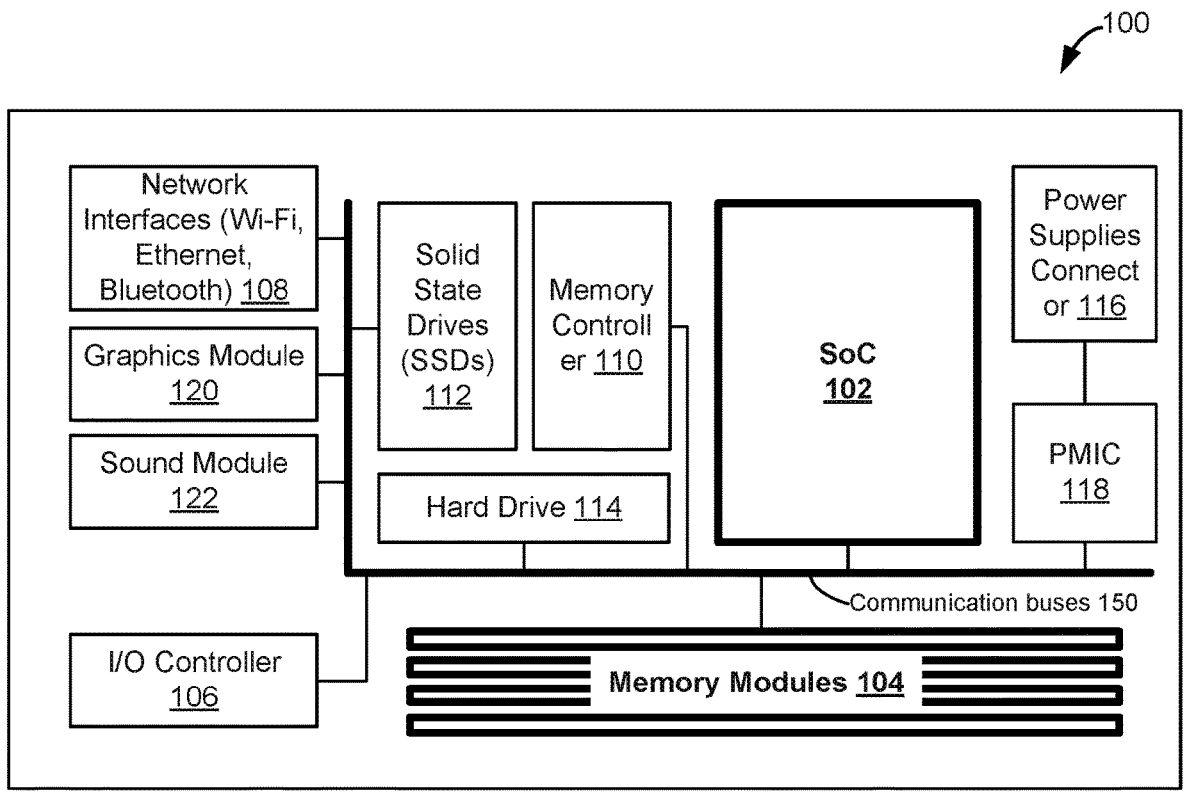
FIG. 1A is a block diagram of an example system module in a typical electronic device, in accordance with some implementations.

For a better understanding of the various described implementations, reference should be made to the Detailed Description below, in conjunction with the following drawings in which like reference numerals refer to corresponding parts throughout the figures. Like reference numerals refer to corresponding parts throughout the drawings.

DESCRIPTION OF IMPLEMENTATIONS

Reference will now be made in detail to specific embodiments, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details.

FIG. 1A is a block diagram of an example system module 100 in a typical electronic device, in accordance with some implementations. System module 100 in this electronic device includes at least a system on a chip (SoC) 102 having one or more processors, memory modules 104 for storing programs, instructions and data, an input/output (I/O) controller 106, one or more communication interfaces such as network interfaces 108, and one or more communication buses 150 for interconnecting these components. In some implementations, I/O controller 106 allows SoC 102 to communicate with an I/O device (e.g., a keyboard, a mouse or a touch screen) via a universal serial bus interface. In some implementations, network interfaces 108 includes one or more interfaces for Wi-Fi, Ethernet and Bluetooth networks, each allowing the electronic device to exchange data with an external source, e.g., a server or another electronic device. In some implementations, communication buses 150 include circuitry (sometimes called a chipset) that interconnects and controls communications among various system components included in system module 100.

In some implementations, memory modules 104 include high-speed random access memory, such as DRAM, SRAM, DDR RAM or other random access solid state memory devices. In some implementations, memory modules 104 include non-volatile memory, such as one or more magnetic disk storage devices, optical disk storage devices, flash memory devices, or other non-volatile solid-state storage devices. In some implementations, memory modules 104, or alternatively the non-volatile memory device(s) within memory modules 104, include a non-transitory computer readable storage medium. In some implementations, memory slots are reserved on system module 100 for receiving memory modules 104. Once inserted into the memory slots, memory modules 104 are integrated into system module 100.

In some implementations, system module 100 further includes one or more components selected from:
- a memory controller 110 that controls communication between SoC 102 and memory components, including memory modules 104, in electronic device;
- solid-state drives (SSDs) 112 that apply integrated circuit assemblies to store data in the electronic device, and in many implementations, are based on NAND or NOR memory configurations;
- a hard drive 114 that is a conventional data storage device used for storing and retrieving digital information based on electromechanical magnetic disks;
- a power supply connector 116 that includes one or more direct current (DC) power supply interfaces each of which is configured to receive a distinct DC supply voltage;
- power management integrated circuit (PMIC) 118 that modulates the distinct DC supply voltages received via the DC power supply interfaces to other desired internal supply voltages, e.g., 5V, 3.3V or 1.8V, as required by various components or circuits (e.g., processor cores in the SoC 102) within electronic device;
- a graphics module 120 that generates a feed of output images to one or more display devices according to their desirable image/video formats; and
- a sound module 122 that facilitates the input and output of audio signals to and from the electronic device under control of computer programs.

It is noted that communication buses 150 also interconnect and control communications among various system components including components 110-122.

One skilled in the art knows that other non-transitory computer readable storage media can be used, as new data storage technologies are developed for storing information in the non-transitory computer readable storage media in the memory modules 104 and in SSDs 112. These new non-transitory computer readable storage media include, but are not limited to, those manufactured from biological materials, nanowires, carbon nanotubes and individual molecules, even though the respective data storage technologies are currently under development and yet to be commercialized.

In some implementations, SoC 102 is implemented in a semiconductor package including one or more integrated circuits, and each integrate circuit integrates a subset of: one or more microprocessor or CPU cores, memory, input/output ports and secondary storage on a single substrate. PMIC 118 is also implemented in a semiconductor package including one or more integrated circuits each of which is formed on a single substrate. SoC 102 is configured to receive one or more internal supply voltages (also called rail voltages) provided by PMIC 118 via one or more power rails. In some implementations, both SoC 102 and PMIC 118 are mounted on a main logic board, e.g., on two distinct areas of the main logic board, and electrically coupled to each other via conductive wires formed in the main logic board. This arrangement introduces parasitic effects and electrical noise that could compromise performance of the SoC, e.g., cause a voltage drop at an internal supply voltage. Alternatively, in accordance with various implementations described below, semiconductor dies of SoC 102 and PMIC 118 are vertically packaged in an integrated semiconductor device 150 (e.g., in FIG. 1B), such that they are electrically coupled to each other via electrical connections that are not formed in the main logic board. Such vertical arrangement of the semiconductor dies of SoC 102 and PMIC 118 reduces a length of electrical connections between SoC 102 and PMIC 118 and avoids performance degradation caused by routing conductive wires on the main logic board.

In some implementations, a generic PMIC 118 is configured to drive different types of SoC 102 in different types of electronic devices. Regardless of whether PMIC 118 and SoC 102 are arranged side by side or vertically, PMIC 118 occupies the same footprint with respect to the main circuit board, while SoC 102 may have a distinct footprint based on the electronic modules integrated therein. PMIC 118 includes a plurality of voltage regulator units that are arranged in a field programmable array. The plurality of voltage regulator units are identical to each other, or includes more than one type of voltage regulator units. In a specific electronic device, control signals are determined based on rail voltages and rail currents of power rails required to power SOC 102 and other electronic modules, if any. For each of these power rails, a corresponding control signal is used to select a subset of voltage regulator units in the field programmable array of PMIC 118, and the selected voltage regulator units provide a rail current at a rail voltage to the respective power rail collectively. As such, PMIC 118 is reconfigured by these control signals to provide the rail voltages and currents to the power rails of SoC 102, and each voltage regulator unit in a plurality of configurable voltage regulators in PMIC 118 is either redundant or selected to drive one of the power rails by one of the control signals.

Figure 1B:
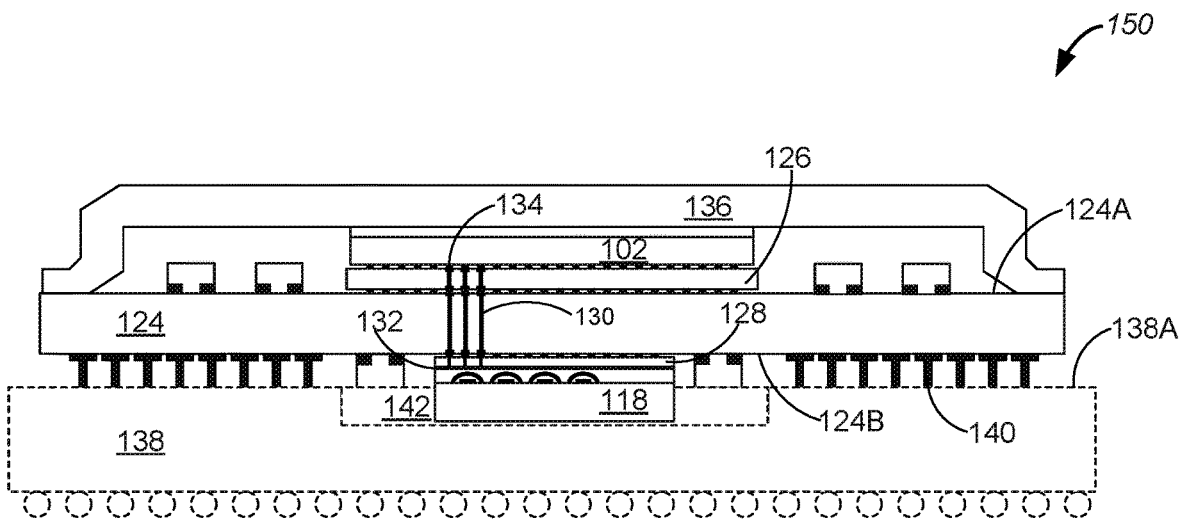
FIG. 1B is a cross sectional view of an integrated semiconductor device integrating an SoC and a PMIC, in accordance with some implementations.

FIG. 1B is a cross sectional view of an integrated semiconductor device 150 integrating an SoC die 102 and a PMIC die 118, in accordance with some implementations. Semiconductor device 150 integrates at least one SoC die 102 and at least one PMIC die 118 in a semiconductor package, and includes at least a package substrate 124 having a first surface 124A and a second surface 124B that is opposite to first surface 124A. SoC die 102 is disposed on first surface 124A of package substrate 124, and PMIC die 118 is coupled to second surface 124B of package substrate 124. In some implementations, a first interposer 126 is disposed between SoC die 102 and first surface 124A of package substrate 124. In some implementations, a second interposer 128 is disposed between PMIC die 220 and second surface 124B of package substrate 124.

Package substrate 124 further includes a plurality of first via interconnects 130, and PMIC die 118 is electrically coupled to SoC die 102 via the plurality of first via interconnects 130 of package substrate 124. Specifically, PMIC die 118 includes a plurality of DC connections 132 configured to output a plurality of rail voltages, provided to power rails. When PMIC die 118 is mounted on second surface 124B of package substrate 124, DC connections 132 are electrically coupled to the plurality of first via interconnects 130 of package substrate 124. In some implementations, SoC die 102 includes a plurality of power connections 134 configured to receive the plurality of rail voltages via the plurality of first via interconnects 130 of package substrate 124. As such, PMIC die 118 is configured to provide DC power (i.e., rail voltages and rail current of power rails) to SoC die 102 via DC connections 132 of PMIC die 118, power connections 134 of SoC die 102, and first via interconnects 130 of package substrate 124. Further, by using very low impedance DC connections 132, the quality of the DC power provided PMIC die 118 to SoC die 102 is substantially improved relative to systems in which PMIC die 118 and SoC die 102 are separately packaged and positioned side by side on a main circuit board.

Figure 2:
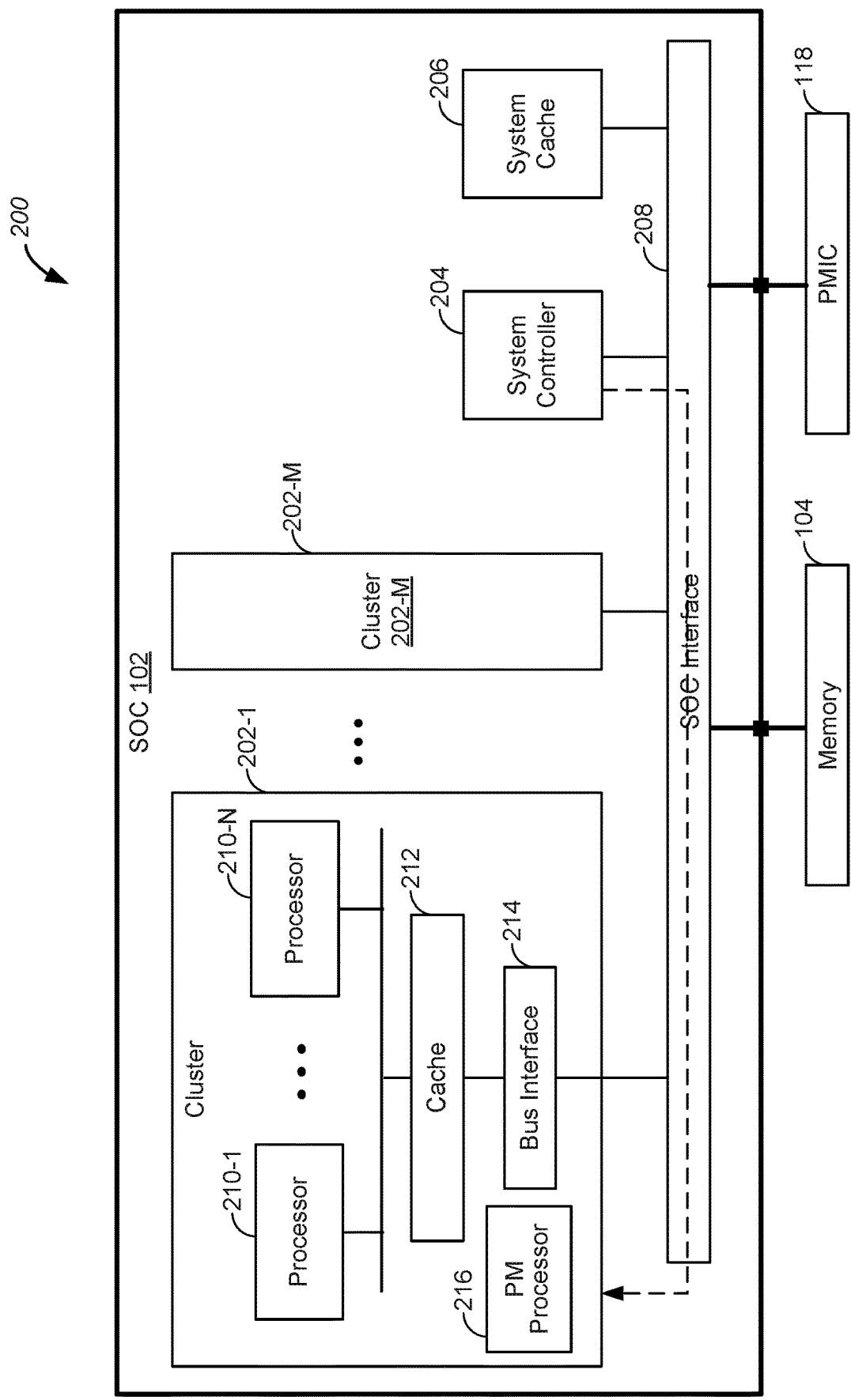
FIG. 2 is a block diagram of a power management system of an electronic device shown in FIG. 1, in accordance with some implementations.
Figure 4:
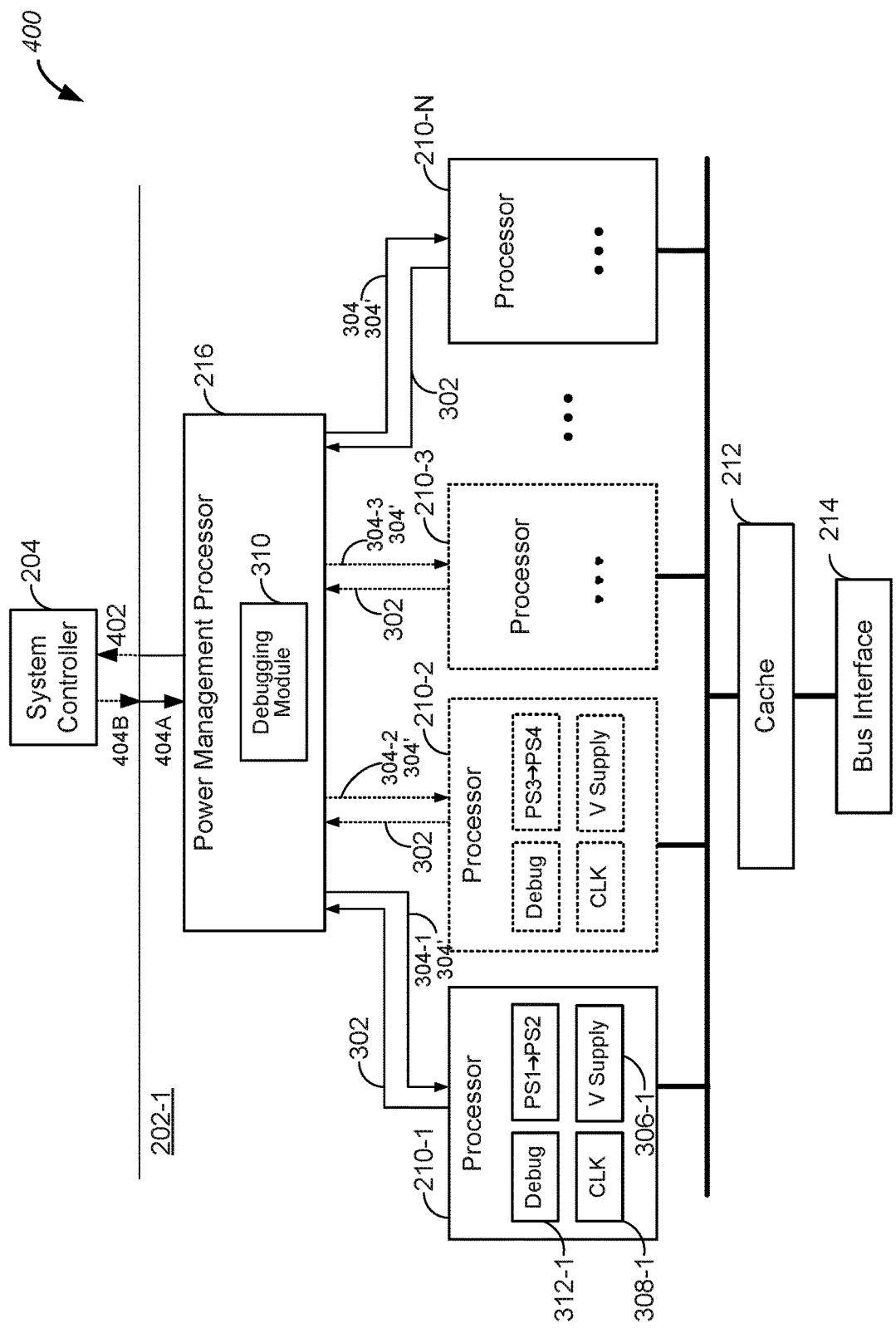
FIG. 4 is a power management environment in which a first processing cluster is coupled to a system controller, in accordance with some implementations.

In some implementations, a power management interface on PMIC die 118 is controlled by a master power management interface of SoC die 102, e.g., which includes a system controller 204 in FIGS. 2 and 4, and configured to receive digital power control signals from SoC die 102. A subset of first via interconnects 130 is configured to transfer digital power control signals from SoC die 102 to PMIC die 118.

In some implementations, integrated semiconductor device 150 further includes a cover 136 coupled to first surface 124A of package substrate 124. Cover 136 is configured to conceal SoC die 102 and at least part of first surface 124A of package substrate 124, thereby protecting SoC die 102 and at least part of first surface 124A. In some implementations, semiconductor device 150 further includes a socket substrate 138. Socket substrate 138 has a third surface 138A facing second surface 124B of package substrate 124. Package substrate 124 is electrically coupled to socket substrate 138 via a plurality of electrical connectors 140. Specifically, second surface 124B of package substrate 124 includes a first area (e.g., a central area) to which PMIC die 118 is mechanically coupled and a second area (e.g., a peripheral area) where the plurality of electrical connectors 140 are located. In some implementations, third surface 138A of socket substrate 138 is substantially flat, and PMIC die 118 is disposed between second surface 124B of package substrate 124 and third surface 138A of socket substrate 138. Alternatively, in some implementations, socket substrate 138 includes a recessed portion 142 that is formed on third surface 138A and configured to receive PMIC die 118 when PMIC die 118 is mechanically and electrically coupled to second surface 124B of package substrate 124. In some situations, PMIC die 118 is suspended in recessed portion 142, i.e., separated from a bottom surface of recessed portion 142 by an air gap. Alternatively, in some situations, PMIC die 118 comes into contact with the bottom surface of recessed portion 142 directly or via an intermediate layer (e.g., an adhesive layer, a thermal spreader layer, or a layer that is both adhesive and a thermal spreader).

In some implementations, SoC die 102 and PMIC die 118 are vertically arranged in semiconductor device 150. Power connections 134 of SoC die 102 and DC connections 132 of PMIC die 118 are aligned and positioned in proximity to each other, thereby reducing parasitic resistance and capacitance coupled to each power rail that provides a rail voltage to SoC die 102. It is noted that in some implementations, a plurality of PMIC dies 118 can be disposed in recessed portion 142 of socket substrate 138 and electrically coupled to one or more SoC dies 102 disposed on first surface 124A of package substrate 124. For example, two PMIC dies 118 are disposed in recessed portion 142 of socket substrate 138 to power four SoC dies 102 collectively. One of SoC dies 102 optionally corresponds to a microprocessor or CPU core or a cluster of microprocessor or CPU cores (e.g., a processor 210 or a processing cluster 202 in FIG. 2).

Additionally, in some implementations of this application, PMIC die 118 includes a field programmable array of voltage regulators that is configurable by control signals to drive different types of SoC dies 102. In some situations, the same PMIC die 118, package substrate 124, and socket substrate 138 are used to support the different types of SoC dies 102. Recessed portion 142 formed on socket substrate 138 has a fixed size to accommodate the same PMIC die 118, and first via interconnects 130 that pass through the body of package substrate 124 have fixed locations. Alternatively, in some situations, while footprint sizes of package substrate 124 and socket substrate 138 are varied for the different types of SoC dies, the same PMIC die 118 allows recessed portion 142 and first via interconnects 130 of package substrate 124 to remain unchanged, thereby avoiding custom designing PMIC die 118 and the entire package for each individual type of SoC die 102. As such, application of the field programmable array of voltage regulators in PMIC die 118 simplifies an assembly process and enhances cost efficiency of the semiconductor device 150.

FIG. 2 is a block diagram of an example electronic device 200 having one or more processing clusters 202 (e.g., first processing cluster 202-1, Mth processing cluster 202-M), in accordance with some implementations. Electronic device 200 includes an SoC 102, a memory 104, and a PMIC 118. The SoC 102 includes the one or more processing clusters 202, a system controller 204, a system cache 206, and an SoC interface 208. The SoC interface 208 is interconnect architecture that facilitates data and control transmission across all linked components, i.e., communication between a subset of the processing clusters 202, system controller 204, system cache 206, memory 104, and PMIC 118. The SoC interface 208 has a shared bus configuration or a point-to-point fabric configuration.

Each processing cluster 202 includes one or more processors (also called processing cores) 210, a cluster cache 212, a bus interface 214, and a power management processor 216. Cluster cache 212 is coupled to one or more processors 210, and maintains one or more request queues for one or more processors 210. In some implementations, each processor 210 further includes a core cache (not shown in FIG. 2) that is optionally split into an instruction cache and a data cache, and the core cache stores instructions and data that can be immediately executed by the respective processor 210. In an example, first processing cluster 202-1 includes first processor 210-1, N-th processor 210-N, and first cluster cache 212-1, where N is an integer than 1. In some implementations, SOC 102 only includes a single processing cluster 202-1. Alternatively, in some implementations, SOC 102 includes at least an additional processing cluster 202, e.g., M-th processing cluster 202-M. M-th processing cluster 202-M includes a first processor, . . . , an N'-th processor, and an M-th cluster cache, where N' is an integer greater than 1.

In some implementations, the one or more processing clusters 202 are configured to provide a central processing unit for an electronic device and are associated with a hierarchy of caches. For example, the hierarchy of caches includes three levels that are distinguished based on their distinct operational speeds and sizes. For the purposes of this application, a reference to "the speed" of a memory (including a cache memory) relates to the time required to write data to or read data from the memory (e.g., a faster memory has shorter write and/or read times than a slower memory), and a reference to "the size" of a memory relates to the storage capacity of the memory (e.g., a smaller memory provides less storage space than a larger memory). The core cache, cluster cache 212, and system cache 206 correspond to a first level (L1) cache, a second level (L2) cache, and a third level (L3) cache, respectively. Each core cache holds instructions and data to be executed directly by a respective processor 210, and has the fastest operational speed and smallest size among the three levels of memory. For each processing cluster 202, the cluster cache 212 is slower operationally than the core cache and bigger in size, and holds data that is more likely to be accessed by processors 210 of respective processing cluster 202. The cache 206 is shared by the plurality of processing clusters 202, and bigger in size and slower in speed than each core cache and cluster cache 212.

The processing clusters 202 issue prefetch requests to extract the instructions and data to be held by each core cache from the cluster cache 212, cache 206 or memory 104. If the prefetch requests are satisfied by the cluster cache 212, the cluster cache 212 provides the instructions and data to the respective core cache for execution by the processors 210. Conversely, if the prefetch requests are not satisfied by the cluster cache 212, the prefetch requests are sent to the cache 206 via the bus interface 214 to extract the instructions and data. If the prefetch requests are satisfied by the cache 206, the cache 206 provides the instructions and data via the bus interface 214 to the cluster cache 212, which further passes the instructions and data to the respective core cache for execution by the processors 210. Conversely, if the prefetch requests are not satisfied by the cache 206, the prefetch requests are sent to the memory 104 external to the SoC 102 to extract the instructions and data. The memory 104 provides the instructions and data to the cache 206, which passes the instructions and data to the cluster cache 212 and then to the respective core cache.

Additionally, the processing clusters 202 issue memory access requests to write data into and read data from the cluster cache 212, cache 206 or memory 104 during normal operation of each processing cluster 202. Each memory access request is passed sequentially from the cluster cache 212, cache 206, and memory 104, until the respective memory access request reaches a target cache or memory. Data to be written into the target cache or memory are passed sequentially from the cluster cache 212, cache 206, and memory 104, until the respective data reach the target cache or memory. In contrast, data read from the target cache or memory are provided directly to the respective core caches to be used by the processors 210.

For each processing cluster 202, the power management processor 216 manages power consumption of the respective processing cluster 202 and performs debugging of the respective processing cluster 202. Operations of the processing clusters 202, PMIC 118, cache 206, and memory 104 consume power and create heat on the electronic device 200. The power management processor 216 is applied to manage power consumptions of the electronic device 200 from a firmware level. Specifically, for each respective processing cluster 202, the power management processor 216 is configured to obtain performance information about the one or more processors 210, execute power instructions to transition a first processor 210-1 from a first performance state (also called P-state) PS1 to a second performance state PS2, and execute one or more debug instructions to perform debugging of a respective processor (e.g., the first processor 210-1 or a different processor) of the one or more processors 210 of the respective processing cluster 202. The power instructions are executed in accordance with the obtained performance information and independently of respective performance states of other processors 210 in the one or more processors 210. In some embodiments, the one or more debug instructions are executed to perform debugging of the first processor 210-1 when the first processor operates at the second performance state S2.

In some implementations, the power management processor 216 manages power performance jointly with the system controller 204, which is configured to define power allocations to the one or more processing clusters 202. Optionally, the system controller 204 is external to any of the one or more processing clusters 202 of the electronic device, e.g., the first processing cluster 202-1. Optionally, the system controller 204 define the power allocations of all processing clusters 202, and however, is disposed internal within one of the one or more processing clusters 202, (e.g., the first processing cluster 202-1). The SoC 102 is further coupled to a PMIC 118. The power management processor 216 of each processing cluster 202 is configured to communicate with the PMIC 118 having one or more voltage regulators, thereby enabling the respective processing cluster 202 to be powered by one or more power rails driven by the voltage regulators of the PMIC 118. By these means, the power management processor 216 and system controller 204 form a hierarchical power management system that is configured to manage power consumption of a multiprocessor electronic device 200 from both a firmware level and a system level.

Figure 3:
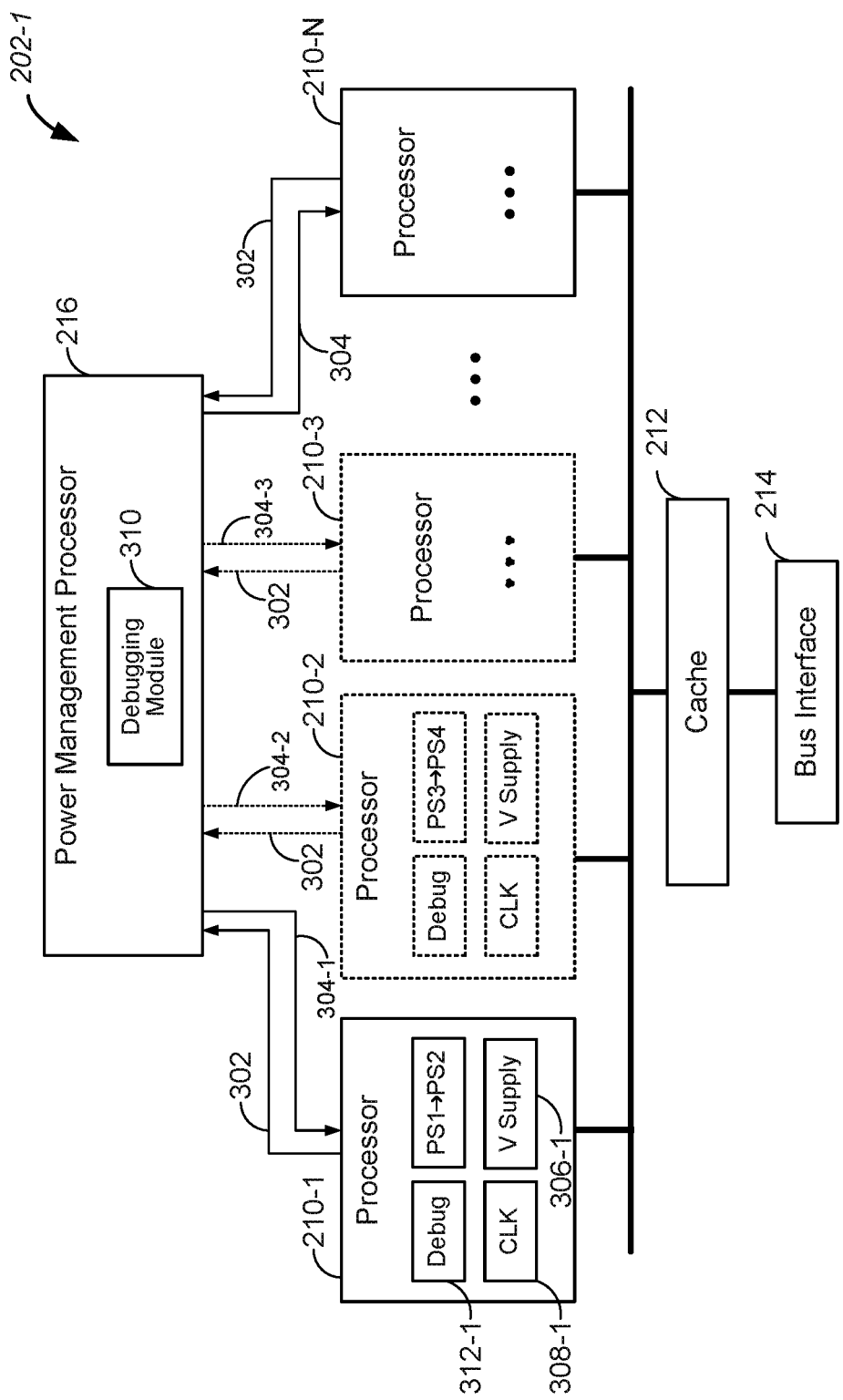
FIG. 3 is a block diagram of a first processing cluster including one or more processors and a power management processor, in accordance with some implementations.

FIG. 3 is a block diagram of a first processing cluster 202-1 including one or more processors 210 and a power management processor 216, in accordance with some implementations. Optionally, the one or more processors 210 only includes a single processor 210-1. Optionally, the one or more processors 210 includes two or more processors 210-1, ..., and 210-N, where N is a positive integer than 1. The power management processor 216 is coupled to the one or more processors 210, and is configured to manage power consumption and/or perform debugging of each processor 210 of the first processing cluster 202-1. Cluster cache 212 is coupled to one or more processors 210, and configured to maintain one or more request queues for one or more processors 210, provide instructions and data to a respective core cache of each processor 210 for execution by the respective processor 210, and fetch missing instructions or data from a system cache 206 and/or memory 104. The bus interface 214 is coupled to one or more of the cluster cache 212, power management processor 216, one or more processors 210, and configured to facilitate at least communication with external components, e.g., a different processing cluster 202, system controller 204, system cache 206, memory 104, and PMIC 118.

In some implementations, the power management processor 216 obtains performance information 302 about a plurality of processors 210-1, ..., and 210-N. The performance information 302 includes activity levels (e.g., instructions per clock cycle), energy consumption, temperature measurements, counts of performance limit breaches, and/or throttling instructions (e.g., clock throttling instructions) for one or more of the plurality of processors 210. In some implementations, a count of performance limit breach is defined as a number of times a respective performance limit was breached in a respective time window, such as the number of times a processor 210 breached an overcurrent limit. For example, a current of a processor 210-1 is sampled 1000 Hz, and a count of current limit breach corresponds to a number of samples for which a respective current limit was reached in every 100 milliseconds. The overcurrent limit is 80% for every 100 milliseconds. Thus, if the count of current limit breach exceeds 80 samples, the overcurrent limit is breached, and the processor 210 is determined to be operating at an overcurrent condition.

In accordance with the performance information 302 collected from different processors 210, the power management processor 216 executes first instructions 304-1 to transition a first processor 210-1 of the plurality of processors 210 from a first performance state PS1 to a second performance state PS2, independently of respective performance states of other processors in the plurality of processors 210. The second performance state PS2 is different from the first performance state PS1. In some implementations, the performance state of other processors 210 are not changed in response to the first instructions 304-1, although the performance state of other processors 210 may be changed in coordination with changing the performance state of the first processor 210-1 to optimize performance states across the plurality of processors 210, for example to satisfy an overall power allocation for the first processing cluster 202-1. In some implementations, any instructions 304 to transition a performance state of a respective processor of the plurality of processors 210 are executed by the power management processor 216 of the first processing cluster 202-1, and not by any processor 210 of the plurality of processors 210.

In some implementations, the obtained performance information 302 includes temperatures of one or more processors 210 (e.g., the first processor 210-1). In accordance with the performance information indicating an increase in a temperature of the first processor 210-1, the power management processor 216 reduces power consumptions of the first processor 210, thereby reducing the temperature of the first processor 210-1. Stated another way, at a current time, the temperature of the first processor 210-1 is measured to be higher than a temperature of the first processor 210-1 previously received, be higher than a predefined temperature threshold, or increase at a rate faster than a predefined temperature increase rate. In response, the power management processor 216 controls the first processor 210-1 to transition to the second performance state PS2 that is associated with lower power consumption than the first performance state PS1. In an example, the second performance state PS2 is associated with a lower clock frequency 308-1 and/or a lower supply voltage 306-1. Conversely, in some implementations, in accordance with the performance information indicating a drop in a temperature of the first processor 210-1 (e.g., the temperature is lower than the same or a lower predefined temperature threshold), the power management processor 216 increases power consumption of the first processor 210-1 by enabling the second performance state PS2 that is associated with a higher clock frequency 308-1 and/or a higher supply voltage 306-1 than the first performance state PS1.

In some implementations associated with performance breaches, in accordance with the performance information 302 indicating a respective number of performance limit breaches in a respective time period that exceeds a threshold number of performance limit breaches for the respective time period, the second performance state PS2 is a state that is associated with lower power consumption than the first performance state PS1. For example, if it is determined that the count of current limit breach exceeds a first overcurrent limit (e.g., 80% of all samples) within 100 milliseconds, the power management processor 216 reduces power consumption of the first processor 210-1 by enabling the second performance state PS2 that is associated with a lower clock frequency 308-1 and/or a lower supply voltage 306-1 than the first performance state PS1. Conversely, in some implementations, in accordance with the performance information 302 indicating the respective number of performance limit breaches in the respective time period that drops below the same or a distinct threshold number of performance limit breaches for the respective time period, the second performance state PS2 is a state that is associated with higher power consumption than the first performance state PS1. For example, if it is determined that the count of current limit breach drops below a second overcurrent limit (e.g., 5% of all samples) within a minute, the power management processor 216 increases power consumption of the first processor 210-1 by enabling the second performance state PS2 that is associated with a higher clock frequency 308-1 and/or a higher supply voltage 306-1 than the first performance state PS1.

Additionally, the power management processor 216 is configured to execute one or more debug instructions to perform debugging of a respective processor of the plurality of processors 210, e.g., based on the obtained performance information 302. The respective processor 210 is optionally the first processor 210-1 that executes the first instructions 304-1 or any other processor 210 different from the first processor 210-1. Specifically, in some embodiments, the one or more debug instructions are executed to perform debugging of the first processor 210-1 when the first processor operates at the second performance state S2. In some situations, the power management processor 216-1 performs debugging of the respective processor 210 while the respective processor 210 is executing an application. In some implementations, the power management processor 216 includes a debugging module 310 dedicated to executing debug instructions for debugging any of the plurality of processors 210. Each processor 210 optionally includes a respective debugging unit 312 configured to perform debugging of the respective processor 210 jointly with the debugging module 310 of the power management processor 216 in accordance with the one or more corresponding debug instructions.

In some implementations, transitioning the first processor 204-1 from the first performance state PS1 to the second performance state PS2 includes modifying a supply voltage 306-1 provided to the first processor 210-1 independently of respective voltages 306 provided to other processors 210 in the plurality of processors 210. Additionally and alternatively, in some implementations, transitioning the first processor 204-1 from the first performance state PS1 to the second performance state PS2 includes modifying a clock frequency 308-1 of the first processor 210-1 independently of respective clock frequencies 308 of other processors 210 in the plurality of processors 210.

In some implementations, the power management processor 216 is configured to execute second instructions 304-2 to transition a second processor 210-2 of the plurality of processors 210 from a third performance state PS3 to a fourth performance state PS4 in accordance with the obtained performance information 302, independently of respective performance states PS of other processors in the plurality of processors 210. The second processor 210-2 is different from the first processor 210-1. The second instructions 304-2 are different from the first instructions 304-1, and the third performance state PS3 is different from the fourth performance state PS4. In some scenarios, the third performance state PS3 is different from the first performance state PS1. In some scenarios, the fourth performance state PS4 is different from the second performance state PS2.

In some implementations, each processor 210 is operable at a plurality of P-states each of which corresponds to a predefined set of power and performance settings (e.g., voltage supplies, clock frequency). For example, a high-performance P-state of a processor 210 reflects an absolute maximum performance the processor 210 may reach, assuming ideal conditions. This P-state does not sustain for long durations and may only be achievable by forcing other processors 210 or memory 104 into a specific state (e.g., an idle state, a standby state). A nominal P-state of a processor 210 reflects a maximum sustained performance level of the processor 210, assuming ideal operating conditions. In the absence of an external constraint (power, thermal, etc.), this is the performance level that the SoC-based electronic device maintains continuously. In some implementations, all processors 210 sustain their nominal P-states simultaneously. A guaranteed P-state of a processor 210 reflects a current maximum sustained performance level of the processor 210, taking into account all known external constraints (power budgeting, thermal constraints, DC or AC power source, etc.). In some implementations, all processors 210 sustain their guaranteed P-states simultaneously. The guaranteed P-state is required to fall in a performance range between a lowest performance level and a nominal performance level that corresponds to the nominal P-state, inclusive. In some situations, the guaranteed P-state is updated once per second to reflect thermal and power constraints.

In some implementations, the performance information 302 indicates a third processor 210-3 of the plurality of processors 210, different from the first processor 210-1, transitioning from an off state to an on state. The power management processor 216 executes the first instructions 304-1 to reduce power consumption of the first processor 210-1 to accommodate an increase of power consumption by the third processor 210-3. The second performance state PS2 is a state that is associated with lower power consumption than the first performance state PS1. In an example, the first performance state PS1 is an active power state, and the second performance state PS2 is a standby or idle power state. In another example, both of the performance states PS1 and PS2 are active power states, and the second performance state PS2 is a lower power state than the first performance state PS1, e.g., has a lower clock frequency 308-1 and/or a lower supply voltage 306-1 than the first performance state PS1.

Conversely, in some implementations, the performance information 302 indicates a fourth processor 210-N of the plurality of processors 210, different from the first processor 210-1, transitioning from an on state to an off state. The power management processor 216 executes the first instructions 304-1 to increase power consumption of the first processor 210-1 to balance a decrease of power consumption by the fourth processor 210-N. The second performance state PS2 is a state that is associated with higher power consumption than the first performance state PS1. In an example, the first performance state PS1 is a standby or idle power state, and the second performance state PS2 is an active power state. In another example, both of the performance states PS1 and PS2 are active power states, and the second performance state PS2 is a higher power state than the first performance state PS1, e.g., has a higher clock frequency 308-1 and/or a higher supply voltage 306-1 than the first performance state PS1.

FIG. 4 is a power management environment 400 in which a first processing cluster 202-1 is coupled to a system controller 204, in accordance with some implementations. As shown in FIG. 2, an electronic device 200 includes one or more processing clusters including the first processing cluster 202-1. The first processing cluster 202-1 includes a plurality of processors 210, a cluster cache 212, a power management processor 216, and a bus interface 214. The system controller 204 is coupled to the power management processor 216 of the first processing cluster 202-1, e.g., via the bus interface 214, and configured to manage power consumption and perform debugging of the first processing cluster 202-1 jointly with power management processor 216 of the first processing cluster 202-1. Optionally, the system controller 204 is external to any of the one or more processing clusters 202 of the electronic device, i.e., external to this first processing cluster 202-1 in FIG. 4. Optionally, the system controller 204 define the power allocations of all processing clusters 202, and however, is disposed internal within one of the one or more processing clusters 202 (e.g., the first processing cluster 202-1).

Specifically, in some implementations, the power management processor 216 is configured to provide cluster performance information 402 to the system controller 204 and receive, from the system controller 204, a first power allocation 404A for the first processing cluster 202-1. The first power allocation 404A is optionally determined by the system controller 204 based on the cluster performance information 402 and similar information from other processing clusters 202. In some situations, the cluster performance information 402 includes a subset or all of the performance information 302 about the plurality of processors 210 of the first processing cluster 202-1. Alternatively, in some situations, a subset of the cluster performance information 402 is derived based on the performance information 302 about the plurality of processors 210 of the first processing cluster 202-1 In accordance with the first power allocation 404A for the first processing cluster 202-1, the power management processor 216 assigns respective performance states PS to the plurality of processors 210, e.g., assigns the first or second performance state P1 or P2 to the first processing unit 210-1 in FIG. 2. The total power consumption of the plurality of processors 210 in the first processing cluster 202-1 does not exceed the first power allocation 404A, as long as the first processing cluster 202-1 is assigned the first power allocation 404A. For example, the transition of the first processor 210-1 to the second performance state PS2 is subject to the first power allocation 404A.

The system controller 204 manages systemwide performance and power consumption by assigning a respective power allocation 404 to each of the plurality of the processing clusters 202. For each processing cluster 202, the respective power allocation 404 is sometimes called a power budget, and specifies a maximum amount of power that a given processing cluster may consume. In some implementations, the plurality of the processing clusters 202, cache 206, and memory 104 are grouped to a plurality of power domains, and the system controller 204 assigns a respective power allocation to each of the plurality of power domain. For a power domain including a first processing cluster 202-1, the respective power allocation to the power domain is optionally divided and assigned to the first processing cluster 202-1, or utilized within the power domain and at least partially subject to a control of the power management processor 216 of the first processing cluster 202-1 that is included in the power domain.

In some implementations, after the performance information 302 is collected by the power management processor 216 of the first processing cluster 202-1, the power management processor 216 and the system controller 204 jointly control a power performance state of a first processor 210-1 within the first processing cluster 202-1. For the power management processor 216, a first amount of time is detected between a time corresponding to the power management processor 216 obtaining the performance information 302 and a time corresponding to the first processor 210-1 transitioning from the first performance state P1 to the second performance state P2 in response to the power management processor 216 executing the first instructions 304-1 to transition performance state of the first processor 210-1. For the system controller 204, a second amount of time is detected between a time corresponding to the system controller 204 obtaining the performance information 302 (e.g., submitted in the cluster performance information 402) and a time corresponding to the first processor 210-1 transitioning from the first performance state PS1 to the second performance state PS2 in response to the system controller 204 executing instructions to transition performance state of the first processor 210-1. The first amount of time is less than the second amount of time. Stated another way, the power management processor 216 controls performance state transitions of the first processor 210-1 existing in the same first processing cluster 202-1 at a rate faster than the system controller 204.

In some examples, transitioning a performance state of a processor 210 in response to instructions from the power management processor 216 local to the first processing cluster 202-1 that includes the processor 210 is faster than transitioning the performance state of the same processor 210 in response to instructions from the system controller 204, by a factor of at least 2, 3, 4, 5, 7, 10, or other factor. This is due at least partially to faster communication between the processors 210 in the first processing cluster 202-1 and the local power management processor 216 than between the processors 210 in the first processing cluster 202-1 and the system controller 204.

In some implementations, the power management processor 216 receives, from the system controller 204, a second power allocation 404B for the first processing cluster 202-1, e.g., after receiving the first power allocation 404A and after transitioning the first processor 210-1 to the second performance state PS2. The second power allocation 404B is different from the first power allocation 404A. The power management processor 216 determines respective performance states of the plurality of processors 210 of the first processing cluster 202-1 in accordance with the second power allocation 404B. The determined respective performance state of the first processor 210-1 is different from the second performance state PS2. The power management processor 216 executes instructions 304' to transition the plurality of processors 210 to the respective performance states, e.g., for a subset of the respective processors 210 whose determined respective performance states are different from their current performance state. The instructions 304' are executed to transition the first processor 210-1 from the second performance state PS2 to the determined respective performance state. In some situations, the system controller 204 assigns a lower power allocation to the first processing cluster 202-1, which is less than a total power consumption of the processors 210 in the first processing cluster 202-1 based on their currently assigned performance states. In response, the power management processor 216 reduces the total power consumption of the first processing cluster 202-1 by assigning lower-power performance states to at least some of the processors 210 in the first processing cluster 202-1.

Figure 5A:
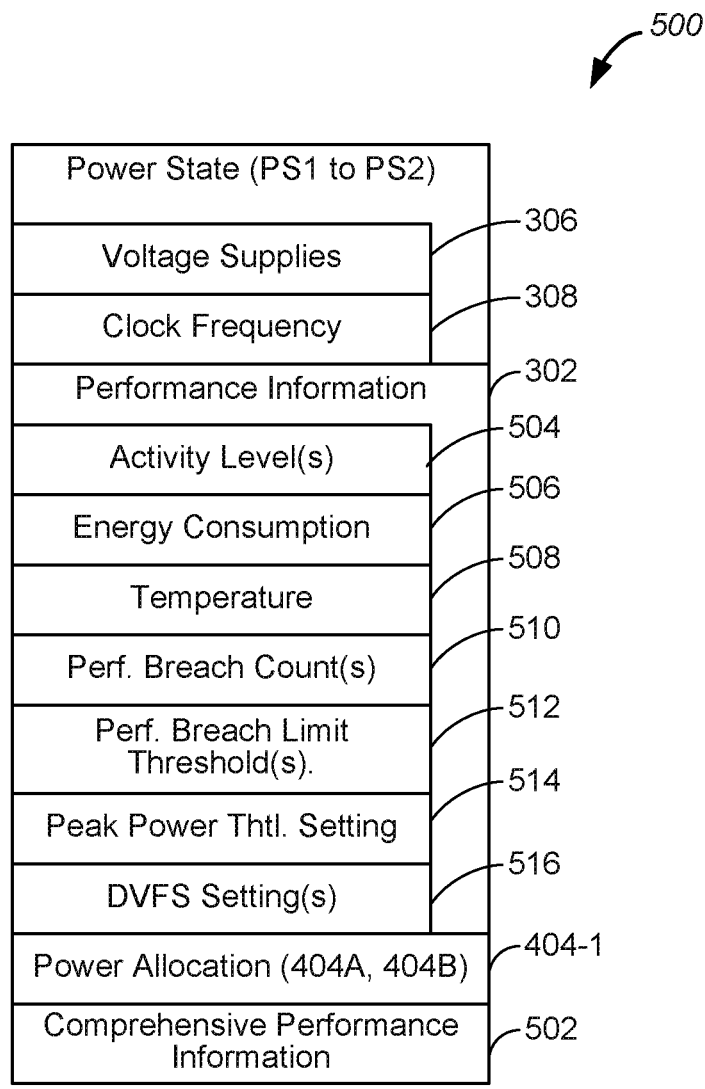
FIGS. 5A and 5B are structures of power management data in a first processing cluster and a system controller, in accordance with some implementations.
Figure 5B:
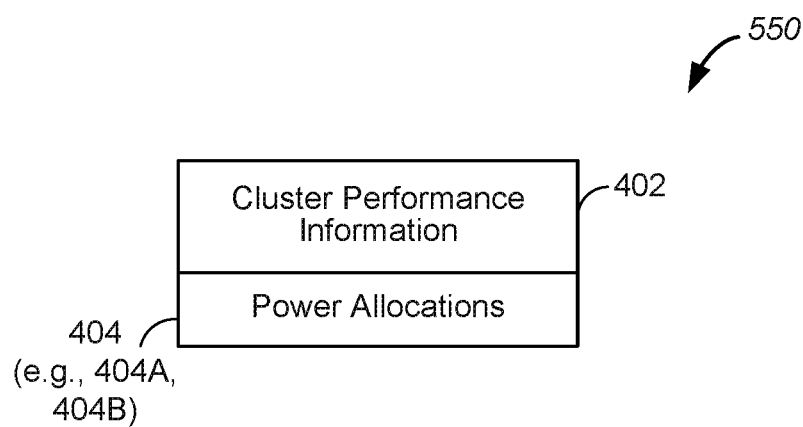

FIGS. 5A and 5B are structures of power management data 500 and 550 in a first processing cluster 202-1 and a system controller 204, in accordance with some implementations, respectively. The power management data 500 are associated with operation of the power management processor 216 that is internal to the first processing cluster 202-1 and configured to manage power consumption and perform debugging of the first processing cluster 202-1. The power management data 500 include information of a power state and performance information 302 of each processor 210 of a subset of the first processing cluster 202-1. In some implementations, the power management data 500 further includes a respective power allocation 404 and comprehensive performance information 502 of the first processing cluster 202-1, and the comprehensive performance information 502 is derived from the performance information 302 of the processors of the first processing cluster 202-1. An example comprehensive performance information 502 includes a temperature increase rate of a processor 210.

For each processor 210, the power state includes information of one or more power supplies 306 and a clock frequency 308. In some implementations, the power state is selected from a plurality of predefined P-states each of which corresponds to predefined set of power and performance settings (e.g., voltage supplies, clock frequency). Examples of the defined P-states include, but are not limited to, a high-performance P-state, a nominal P-state, a guaranteed P-state, and a standby or idle P-state. In some implementations, the power state is defined based on a combination of the one or more power supplies 306 and a clock frequency 308. Each power supply 306 is dynamically selected from a predefined number of voltage level (e.g., 1.8V, 2V, 2.2V, and 2.4V) or defined in a range of voltage levels (e.g., 1.8-2.4V) based on the performance information 302. Each clock frequency 308 is dynamically selected from a predefined number of frequencies (e.g., 1 GHz, 1.2 GHz, and 1.4 GHz) or defined in a range of frequency (e.g., 1-1.4 GHz) based on the performance information 302. In DVFS, the voltage supplies 306 and clock frequency 308 are scaled dynamically to optimize resource utilization and conserve power consumption for different processor operations.

For each processor 210, the performance information 302 includes one or more of: one or more activity levels 504, energy consumption 506, a temperature 508, one or more performance breach counts 510, one or more performance breach limits 512, a peak power throttling setting 514, and DVFS settings 516. An activity level 504 is defined as a number of instructions executed by the respective processor 210 during each clock cycle. A count of performance limit breach 510 is defined as a number of times a respective performance breach limit is reached within a respective time period, e.g., a number of times the respective processor 210 breaches an overcurrent limit). In an example, the throttling settings 514 define conditions under which throttling instructions (e.g., a clock throttling instruction) are issued.

In some implementations, in accordance with the performance information 302 indicating an increase in a temperature of the first processor 210-1, the second performance state PS2 is a state that is associated with lower power consumption than the first performance state PS1. The performance information 302 includes a temperature 508 of the first processor 210-1 that is higher than a temperature 508 of the first processor 210-1 previously received. In some situations, when the temperature increases beyond a predefined temperature threshold or at a rate that is faster than a predefined temperature increase rate, the power management processor 216 executes the first instructions 304-1 to transition the first processor 210-1 from the first performance state PS1 to the second performance state PS2 that has a lower clock frequency and/or a lower voltage than the first performance state PS1.

In some implementations, in accordance with the performance information 302 indicating a decrease in a temperature 508 of the first processor, the second performance state PS2 is a state that is associated with higher power consumption than the first performance state PS1. The temperature 508 of the first processor 210-1 is lower than a temperature 508 of the first processor previously received. In some situations, when the temperature 508 decreases beyond the same or distinct predefined temperature threshold, the power management processor 216 executes the first instructions 304-1 to transition the first processor 210-1 from the first performance state PS1 to the second performance state PS2 that has a higher clock frequency and/or a higher voltage than the first performance state PS1.

In some implementations, in accordance with the performance information 302 indicating a respective number of performance limit breaches 510 in a respective time period that exceeds a threshold number of performance limit breaches for the respective time period, the second performance state PS2 is a state that is associated with lower power consumption than the first performance state PS1, setting a lower clock frequency and/or a lower voltage. The power management processor 216 identifies an overcurrent, overvoltage, overpower, or over-temperature condition in which the first processor 210-1 is excessively driven, and avoids such a condition by decreasing power consumption of the first processor 210-1. Conversely, in some implementations, in accordance with the performance information 302 indicating a respective number of performance limit breaches 510 in a respective time period that drops beyond a distinct threshold number of performance limit breaches for the respective time period, the second performance state PS2 is a state that is associated with higher power consumption than the first performance state PS1, setting a higher clock frequency and/or a higher voltage. The power management processor 216 identifies an undercurrent, undervoltage, underpower, or under-temperature condition in which the first processor 210-1 is insufficiently driven, and compensates such a condition by increasing power consumption of the first processor 210-1.

In some implementations, the power management processor 216 is configured to initialize one or more settings for the plurality of processors by modifying a default hardware state (e.g., of the DVFS settings 516) of the electronic device 200 prior to any of the plurality of processors 210 executing application instructions of applications. For example, if a default hardware state of the first processor 210-1 is different from a preferred operating state, the power management processor 216 is configurable to execute software instructions to change the default hardware state (e.g., of the DVFS settings 516) to the preferred operating state for the first processor 210-1 during the course of initializing the plurality of processors 210, prior to the plurality of processors 210 executing any application instructions. This prevents the plurality of processors 210 from executing instructions while the incorrect default hardware state of the first processor 210-1 is in place. Initialization of the plurality of processors 210 of the first processing cluster 202-1 by the power management processor 216 is typically faster, often significantly so, than initialization by the system controller 204 or other controller, e.g., SoC, external to the first processing cluster 202-1.

Referring to FIG. 5B, the power management data 550 are associated with operation of a system controller 204 that is external to the first processing cluster 202-1 and configured to manage power consumption and perform debugging of the plurality of processing clusters 202 on a system level. The power management data 550 include cluster performance information 402 collected from the plurality of processing clusters 202 and power allocations 404 to the plurality of processing clusters 202. In some situations, the cluster performance information 402 includes a subset or all of the performance information 302 about the plurality of processors 210 of the first processing cluster 202-1. Further, in some situations, the cluster performance information 402 further includes the comprehensive performance data 502 derived based on a subset or all of the performance information 302 about the plurality of processors 210 of the first processing cluster 202-1.

The system controller 204 manages systemwide performance and power consumption, and provides or assigns a power allocation 404 to one or more of the plurality of the processing clusters 202 (e.g., each processing cluster 202, each power domain including one or more processing clusters 202). The power allocation 404 specifies a maximum amount of power that a given processing cluster 202 may consume, and is also called a power budget. For a first processing cluster 202-1, the total power consumption of the plurality of processors 210 in the first processing cluster 202-1 does not exceed the first power allocation 404A to the first processing cluster 202-1, as long as this first power allocation 404A is assigned to the first processing cluster 202-1. For example, the transitioning of the first processor 210-1 of the first processing cluster 202-1 to the second performance state PS2 is subject to the first power allocation 404A to the first processing cluster 202-1.

The system controller 204 collaborates with the power management processor 216 of each processing cluster 202 to manage power management and perform debugging of the processors 210 of the respective processing cluster 202 jointly. In some implementations, when the first processing cluster 202-1 has a first power allocation 404A and after the first processor 210-1 has transitioned to the second performance state PS2, the power management processor 216 of the processing cluster 202-1 receives, from the system controller 204, a second power allocation 404B for the first processing cluster 202-1. The second power allocation 404B is different from the first power allocation 404A. The power management processor 216 determines respective performance states of the plurality of processors 210 in accordance with the second power allocation 404B. The determined respective performance state of the first processor 210-1 is different from the second performance state PS2. The power management processor 216 of the processing cluster 202-1 executes instructions to transition the plurality of processors 210 of the processing cluster 202-1 to the respective performance states, particularly for respective processors 210 whose determined respective performance states are different from their current performance state). For example, additional instructions 304 are executed to transition the first processor 210-1 from the second performance state PS2 to the determined respective performance state. For example, the system controller 204 assigns a lower power allocation to the first processing cluster 202-1, and the lower power allocation is less than a total power consumption of the processors 210 in the first processing cluster 202-1 based on their currently assigned performance states. The power management processor 216 reduces the total power consumption of the first processing cluster 202-1 by assigning lower-power performance states to at least some of the processors 210 in the first processing cluster 202-1.

FIGS. 6A and 6B illustrate a flow diagram of a method 600 of managing power consumption of an SoC-based electronic device 200, in accordance with some implementations. The electronic device 200 includes a plurality of processing clusters 202 including a first processing cluster 202-1. The first processing cluster 202-1 includes a plurality of processors 210 and a power management processor 216 distinct from the plurality of processors 210. The method 600 is implemented by the power management processor 216 to manage power consumption and perform debugging of the first processing cluster 202-1. The power management processor 216 obtains (602) performance information 302 about the plurality of processors 210. In some implementations, the performance information 302 includes (604) activity levels 504, energy consumption 506, temperature measurements 508, counts of performance limit breaches 510, and/or throttling instructions (e.g., peak power throttling setting 512) for one or more of the plurality of processors 210.

The power management processor 216 executes (606) first instructions to transition a first processor 210-1 of the plurality of processors 210 from a first performance state PS1 to a second performance state PS2, different from the first performance state PS1, in accordance with the obtained performance information, independently of respective performance states of other processors 210 in the plurality of processors 210. In some implementations, transitioning the first processor 210-1 from the first performance state PS1 to the second performance state PS2 includes (608) modifying a supply voltage 306-1 provided to the first processor 210-1 independently of respective voltages 306 provided to other processors 210 in the plurality of processors 210. Additionally and alternatively, in some implementations, transitioning the first processor 210-1 from the first performance state PS1 to the second performance state PS2 includes (610) modifying a clock frequency 308-1 of the first processor 210-1 independently of respective clock frequencies 308 of other processors 210 in the plurality of processors 210. In some implementations, in accordance with the performance information indicating (612) an increase in a temperature of the first processor 210-1, the second performance state PS2 is a state that is associated with lower power consumption than the first performance state PS1. In some implementations, in accordance with the performance information indicating (614) a respective number of performance limit breaches in a respective time period that exceeds a threshold number of performance limit breaches for the respective time period, the second performance state PS2 is a state that is associated with lower power consumption than the first performance state PS1.

Additionally, the power management processor 216 executes (616) one or more debug instructions to perform debugging of a respective processor 210 of the plurality of processors 210. In some implementations, the power management processor 216 executes (618) the one or more debug instructions to perform debugging of the respective processor of the plurality of processors 210 while the respective processor executes application instructions. In some embodiments, the one or more debug instructions are executed to perform debugging of the first processor 210-1 when the first processor operates at the second performance state S2. In some implementations, the first processing cluster 202-1 includes (620) a cluster cache 212 coupled to one or more of the plurality of processors 210 in the first processing cluster 202-1, and the power management processor 216 performs the debugging of the respective processor using the cluster cache 212 of the first processing cluster 202-1.

In some implementations, the power management processor 216 executes (622) second instructions 304-2 to transition a second processor 210-2 of the plurality of processors 210 from a third performance state PS3 to a fourth performance state PS4 in accordance with the obtained performance information 302, independently of respective performance states of other processors 210 in the plurality of processors 210.

In some implementations, in accordance with the performance information indicating a third processor 210-3 of the plurality of processors 210, different from the first processor 210-1, the power management processor 216 transitions (624) from an off state to an on state, the second performance state PS2 is a state that is associated with lower power consumption than the first performance state PS1. In some implementations, in accordance with the performance information indicating a fourth processor 210-4 of the plurality of processors 210, different from the first processor 210-1, the power management processor 216 transitions (626) from an on state to an off state, the second performance state PS2 is a state that is associated with higher power consumption than the first performance state PS1.

In some implementations, the device 200 includes a plurality of processing clusters 202 including the first processing cluster 202-1. The power management processor 216 receives (628A), from a system controller 204 that is distinct from the plurality of processing clusters 202, a first power allocation 404A for the first processing cluster 202-1 and assigns (628B) respective performance states to the plurality of processors 210, including the first processor 210-1, in accordance with the first power allocation 404A for the first processing cluster 202-1. Further, in some implementations, the power management processor 216 assigns (630) the respective performance states to the plurality of processors 210 in accordance with the first power allocation 404A such that aggregate power consumption of the plurality of processors 210 in the first processing cluster 202-1 does not exceed the first power allocation 404A.

Additionally, in some implementations, a first amount of time is between a time corresponding to the power management processor 216 obtaining the performance information 302 and a time corresponding to the first processor 210-1 transitioning from the first performance state PS1 to the second performance state PS2 in response to the power management processor 216 executing the first instructions 304-1 to transition performance state of the first processor 210-1. a second amount of time is between a time corresponding to the system controller 204 obtaining the performance information 302 and a time corresponding to the first processor 210-1 transitioning from the first performance state PS1 to the second performance state PS2 in response to the system controller 204 executing instructions to transition performance state of the first processor 210-1. The first amount of time is less than the second amount of time.

In some implementations, the power management processor 216 receives, from the system controller 204, a second power allocation 404B for the first processing cluster 202-1 and determines respective performance states of the plurality of processors 210 in accordance with the second power allocation 404B. The second power allocation 404B is different from the first power allocation 404A, and the determined respective performance state of the first processor 210-1 is different from the second performance state PS2. The power management processor 216 executes instructions to transition the plurality of processors 210 to the respective performance states, including executing instructions to transition the first processor 210-1 from the second performance state PS2 to the determined respective performance state.

In some implementations, the power management processor 216 communicates (632) with power management circuitry (e.g., in the PMIC 118) having one or more voltage regulators that supply power to the device 200. In some implementations, the power management processor 216 initializes one or more settings for the plurality of processors 210 by modifying a default hardware state of the electronic device 200 prior to the plurality of processors 210 executing application instructions.

It should be understood that the particular order in which the operations in FIGS. 6A and 6B have been described are merely exemplary and are not intended to indicate that the described order is the only order in which the operations could be performed. One of ordinary skill in the art would recognize various ways to manage power consumption of an SoC-based electronic device 200 as described herein. Additionally, it should be noted that details of other processes described above with respect to FIGS. 1A-5B are also applicable in an analogous manner to method 600 described above with respect to FIGS. 6A and 6B. For brevity, these details are not repeated here.

Implementation examples are described in at least the following numbered clauses:

Clause 1. A method, comprising: at a first processing cluster with a plurality of processors and a power management controller distinct from the plurality of processors, the first processing cluster is included in an electronic device: obtaining performance information about the plurality of processors; executing first instructions to transition a first processor of the plurality of processors from a first performance state to a second performance state, different from the first performance state, in accordance with the obtained performance information, independently of respective performance states of other processors in the plurality of processors; and executing one or more debug instructions to perform debugging of a respective processor of the plurality of processors.

Clause 2. The method of clause 1, wherein transitioning the first processor from the first performance state to the second performance state includes modifying a voltage provided to the first processor independently of respective voltages provided to other processors in the plurality of processors.

Clause 3. The method of clause 1 or 2, wherein transitioning the first processor from the first performance state to the second performance state includes modifying a clock frequency of the first processor independently of respective clock frequencies of other processors in the plurality of processors.

Clause 4. The method of any of clauses 1-3, further comprising: executing second instructions to transition a second processor of the plurality of processors from a third performance state to a fourth performance state in accordance with the obtained performance information, independently of respective performance states of other processors in the plurality of processors.

Clause 5. The method of any of clauses 1-4, wherein the electronic device includes a plurality of processing clusters including the first processing cluster, further comprising: receiving, from a system controller that is distinct from the plurality of processing clusters, a first power allocation for the first processing cluster; and assigning respective performance states to the plurality of processors, including the first processor, in accordance with the first power allocation for the first processing cluster.

Clause 6. The method of clause 5, further comprising: assigning the respective performance states to the plurality of processors in accordance with the first power allocation such that aggregate power consumption of the plurality of processors in the first processing cluster does not exceed the first power allocation.

Clause 7. The method of clause 5 or 6, wherein: a first amount of time is between a time corresponding to the power management processor obtaining the performance information and a time corresponding to the first processor transitioning from the first performance state to the second performance state in response to the power management processor executing the first instructions to transition performance state of the first processor; a second amount of time is between a time corresponding to the system controller obtaining the performance information and a time corresponding to the first processor transitioning from the first performance state to the second performance state in response to the system controller executing instructions to transition performance state of the first processor; and the first amount of time is less than the second amount of time.

Clause 8. The method of any of clauses 5-7, further comprising: receiving, from the system controller, a second power allocation for the first processing cluster, wherein the second power allocation is different from the first power allocation; determining respective performance states of the plurality of processors in accordance with the second power allocation, wherein the determined respective performance state of the first processor is different from the second performance state; and executing instructions to transition the plurality of processors to the respective performance states, including executing instructions to transition the first processor from the second performance state to the determined respective performance state.

Clause 9. The method of any of clauses 1-8, wherein the performance information includes activity levels, energy consumption, temperature measurements, counts of performance limit breaches, and/or throttling instructions for one or more of the plurality of processors.

Clause 10. The method of any of clauses 1-9, wherein, in accordance with the performance information indicating an increase in a temperature of the first processor, the second performance state is a state that is associated with lower power consumption than the first performance state.

Clause 11. The method of any of clauses 1-10, wherein, in accordance with the performance information indicating a respective number of performance limit breaches in a respective time period that exceeds a threshold number of performance limit breaches for the respective time period, the second performance state is a state that is associated with lower power consumption than the first performance state.

Clause 12. The method of any of clauses 1-11, wherein, in accordance with the performance information indicating a third processor of the plurality of processors, different from the first processor, transitioning from an off state to an on state, the second performance state is a state that is associated with lower power consumption than the first performance state.

Clause 13. The method of any of clauses 1-9, wherein, in accordance with the performance information indicating a fourth processor of the plurality of processors, different from the first processor, transitioning from an on state to an off state, the second performance state is a state that is associated with higher power consumption than the first performance state.

Clause 14. The method of any of clauses 1-13, further comprising: executing the one or more debug instructions to perform debugging of the respective processor of the plurality of processors while the respective processor executes application instructions.

Clause 15. The method of any of clauses 1-13, wherein the one or more debug instructions are executed to perform debugging of the first processor when the first processor operates at the second performance state.

Clause 16. The method of any of clauses 1-14, further comprising: initializing one or more settings for the plurality of processors by modifying a default hardware state of the device prior to the plurality of processors executing application instructions.

Clause 17. The method of any of clauses 1-16, wherein the first processing cluster includes a cache coupled to one or more of the plurality of processors in the first processing cluster, the method further comprising: performing the debugging of the respective processor using the cache of the first processing cluster.

Clause 18. The method of any of clauses 1-17, further comprising: communicating with power management circuitry having one or more voltage regulators that supply power to the device.

Clause 19. An electronic device, comprising: a first processing cluster, including: a plurality of processors; and a power management processor distinct from the plurality of processors; wherein the power management processor is configured to perform a method of any of clauses 1-18.

Clause 20. A non-transitory computer-readable storage medium, having instructions stored thereon, which when executed by a power management processor of a first processing cluster cause the power management processor to perform a method of any of clauses 1-18.

Clause 21. An apparatus for managing power at a first processing cluster with a plurality of processors and a power management controller distinct from the plurality of processors, wherein the first processing cluster is included in an electronic device, the apparatus comprising means for performing operations of any of clauses 1-18.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Additionally, it will be understood that, although the terms "first," "second," etc. may be used herein to describe various elements, these elements should not be limited by these terms. These terms are only used to distinguish one element from another.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

What is claimed is:

1. A method, comprising:
at a first processing cluster with a plurality of processors and a power management controller distinct from the plurality of processors, the first processing cluster is included in an electronic device:
obtaining performance information about the plurality of processors;
executing first instructions to transition a first processor of the plurality of processors from a first performance state to a second performance state, different from the first performance state, in accordance with the obtained performance information, independently of respective performance states of other processors in the plurality of processors; and
executing one or more debug instructions to perform debugging of a respective processor of the plurality of processors,
wherein the electronic device includes a plurality of processing clusters including the first processing cluster, further comprising:
receiving, from a system controller that is distinct from the plurality of processing clusters, a first power allocation for the first processing cluster; and
assigning respective performance states to the plurality of processors, including the first processor, in accordance with the first power allocation for the first processing cluster,
wherein the performance information includes activity levels, energy consumption, temperature measurements, counts of performance limit breaches, and/or throttling instructions for one or more of the plurality of processors, and
wherein, in accordance with the performance information indicating an increase in a temperature of the first processor, the second performance state is a state that is associated with lower power consumption than the first performance state.

2. The method of claim 1, wherein transitioning the first processor from the first performance state to the second performance state includes modifying a voltage provided to the first processor independently of respective voltages provided to other processors in the plurality of processors.

3. The method of claim 1, wherein transitioning the first processor from the first performance state to the second performance state includes modifying a clock frequency of the first processor independently of respective clock frequencies of other processors in the plurality of processors.

4. The method of claim 1, further comprising:
executing second instructions to transition a second processor of the plurality of processors from a third performance state to a fourth performance state in accordance with the obtained performance information, independently of respective performance states of other processors in the plurality of processors.

5. The method of claim 1, further comprising:
assigning the respective performance states to the plurality of processors in accordance with the first power allocation such that aggregate power consumption of the plurality of processors in the first processing cluster does not exceed the first power allocation.

6. The method of claim 1, wherein:
a first amount of time is between a time corresponding to the power management processor obtaining the performance information and a time corresponding to the first processor transitioning from the first performance state to the second performance state in response to the power management processor executing the first instructions to transition performance state of the first processor;
a second amount of time is between a time corresponding to the system controller obtaining the performance information and a time corresponding to the first processor transitioning from the first performance state to the second performance state in response to the system controller executing instructions to transition performance state of the first processor; and
the first amount of time is less than the second amount of time.

7. The method of claim 1, further comprising:
receiving, from the system controller, a second power allocation for the first processing cluster, wherein the second power allocation is different from the first power allocation;
determining respective performance states of the plurality of processors in accordance with the second power allocation, wherein the determined respective performance state of the first processor is different from the second performance state; and
executing instructions to transition the plurality of processors to the respective performance states, including executing instructions to transition the first processor from the second performance state to the determined respective performance state.

8. The method of claim 1, wherein, in accordance with the performance information indicating a respective number of performance limit breaches in a respective time period that exceeds a threshold number of performance limit breaches for the respective time period, the second performance state is a state that is associated with lower power consumption than the first performance state.

9. The method of claim 1, wherein, in accordance with the performance information indicating a third processor of the plurality of processors, different from the first processor, transitioning from an off state to an on state, the second performance state is a state that is associated with lower power consumption than the first performance state.

10. The method of claim 1, wherein, in accordance with the performance information indicating a fourth processor of the plurality of processors, different from the first processor, transitioning from an on state to an off state, the second performance state is a state that is associated with higher power consumption than the first performance state.

11. The method of claim 1, further comprising:
executing the one or more debug instructions to perform debugging of the respective processor of the plurality of processors while the respective processor executes application instructions.

12. The method of claim 1, wherein the one or more debug instructions are executed to perform debugging of the first processor when the first processor operates at the second performance state.

13. The method of claim 1, further comprising:
initializing one or more settings for the plurality of processors by modifying a default hardware state of the device prior to the plurality of processors executing application instructions.

14. The method of claim 1, wherein the first processing cluster includes a cache coupled to one or more of the plurality of processors in the first processing cluster, the method further comprising:
performing the debugging of the respective processor using the cache of the first processing cluster.

15. The method of claim 1, further comprising:
communicating with power management circuitry having one or more voltage regulators that supply power to the device.

16. An electronic device, comprising:
a first processing cluster, including:
a plurality of processors; and
a power management processor distinct from the plurality of processors;
wherein the power management processor is configured to:
obtain performance information about the plurality of processors;
execute first instructions to transition a first processor of the plurality of processors from a first performance state to a second performance state, different from the first performance state, in accordance with the obtained performance information, independently of respective performance states of other processors in the plurality of processors; and
execute one or more debug instructions to perform debugging of a respective processor of the plurality of processors; and
a system controller,
wherein the electronic device further includes a plurality of processing clusters including the first processing cluster, wherein each of the plurality of processing clusters is configured to:
receive, from the system controller that is distinct from the plurality of processing clusters, a first power allocation for the first processing cluster; and
assign respective performance states to the plurality of processors, including the first processor, in accordance with the first power allocation for the first processing cluster,
wherein the performance information includes activity levels, energy consumption, temperature measurements, counts of performance limit breaches, and/or throttling instructions for one or more of the plurality of processors, and
wherein, in accordance with the performance information indicate an increase in a temperature of the first processor, the second performance state is a state that is associated with lower power consumption than the first performance state.

17. A non-transitory computer-readable storage medium, having instructions stored thereon, which when executed by a system controller and power management processor of a first processing cluster cause the system controller and power management processor to perform operations comprising:
obtaining performance information about a plurality of processors of the first processing cluster;
receiving from the system controller a first power allocation for the first processing cluster;
assigning respective performance states to the plurality of processors, including a first processor, in accordance with the first power allocation for the first processing cluster;
executing first instructions to transition the first processor of the plurality of processors from a first performance state to a second performance state, different from the first performance state, in accordance with the obtained performance information, independently of respective performance states of other processors in the plurality of processors; and
executing one or more debug instructions to perform debugging of a respective processor of the plurality of processors, p1 wherein the performance information includes activity levels, energy consumption, temperature measurements, counts of performance limit breaches, and/or throttling instructions for one or more of the plurality of processors, and
wherein, in accordance with the performance information indicating an increase in a temperature of the first processor, the second performance state is a state that is associated with lower power consumption than the first performance state.

18. An apparatus for managing power at a first processing cluster with a plurality of processors and a power management controller distinct from the plurality of processors, wherein the first processing cluster is included in an electronic device, the apparatus comprising:
means for obtaining performance information about the plurality of processors;
means for receiving from the power management controller a first power allocation for the first processing cluster;
means for assigning respective performance states to the plurality of processors, including a first processor, in accordance with the first power allocation for the first processing cluster; means for executing first instructions to transition the first processor of the plurality of processors from a first performance state to a second performance state, different from the first performance state, in accordance with the obtained performance information, independently of respective performance states of other processors in the plurality of processors; and
means for executing one or more debug instructions to perform debugging of a respective processor of the plurality of processors,
wherein the performance information includes activity levels, energy consumption, temperature measurements, counts of performance limit breaches, and/or throttling instructions for one or more of the plurality of processors, and
wherein, in accordance with the performance information means for indicating an increase in a temperature of the first processor, the second performance state is a state that is associated with lower power consumption than the first performance state.

* * * * *